J. G. & F. W. PARSONS.
CONTROLLING LEVER FOR AUTOMOBILES.
APPLICATION FILED MAR. 6, 1917.
1,285,351.
Patented Nov. 19, 1918.
2 SHEETS—SHEET 2.
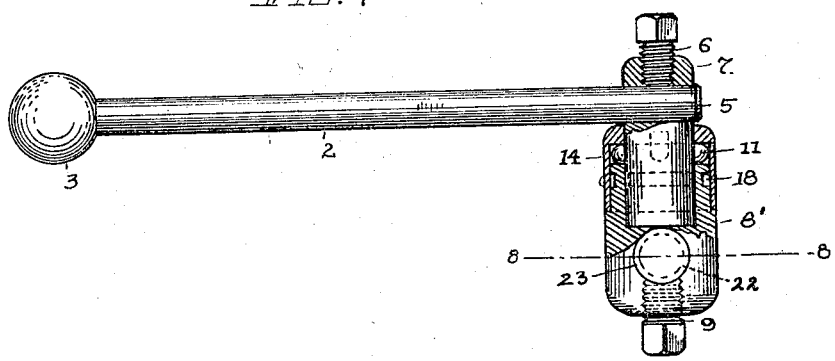
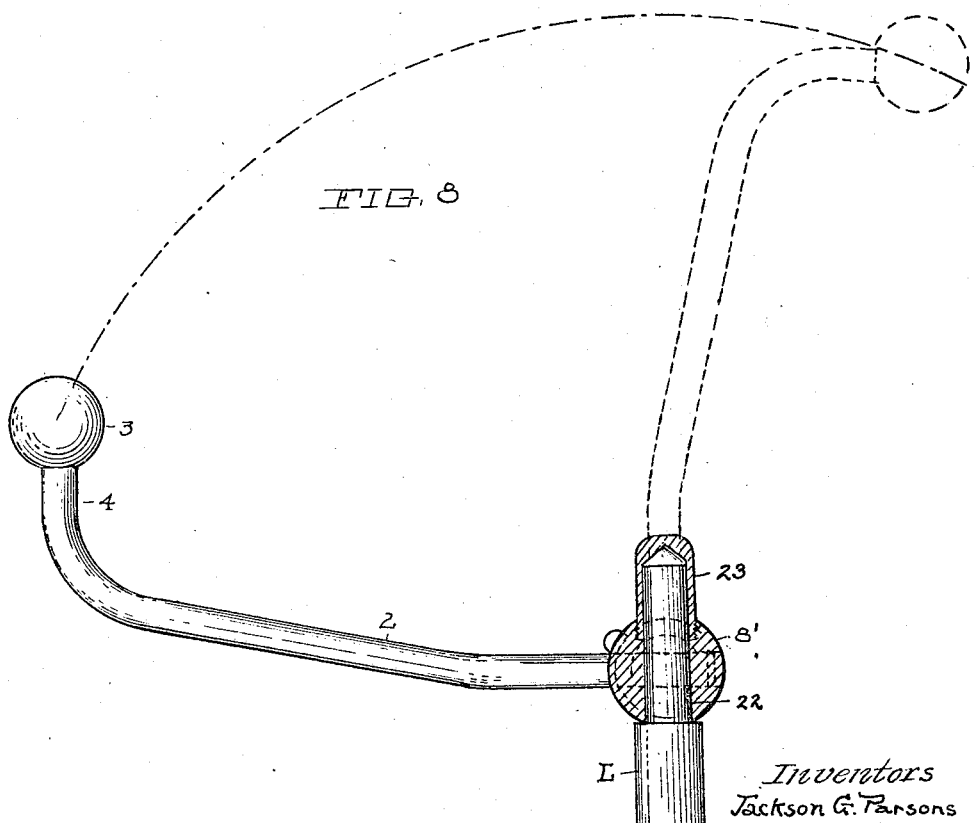

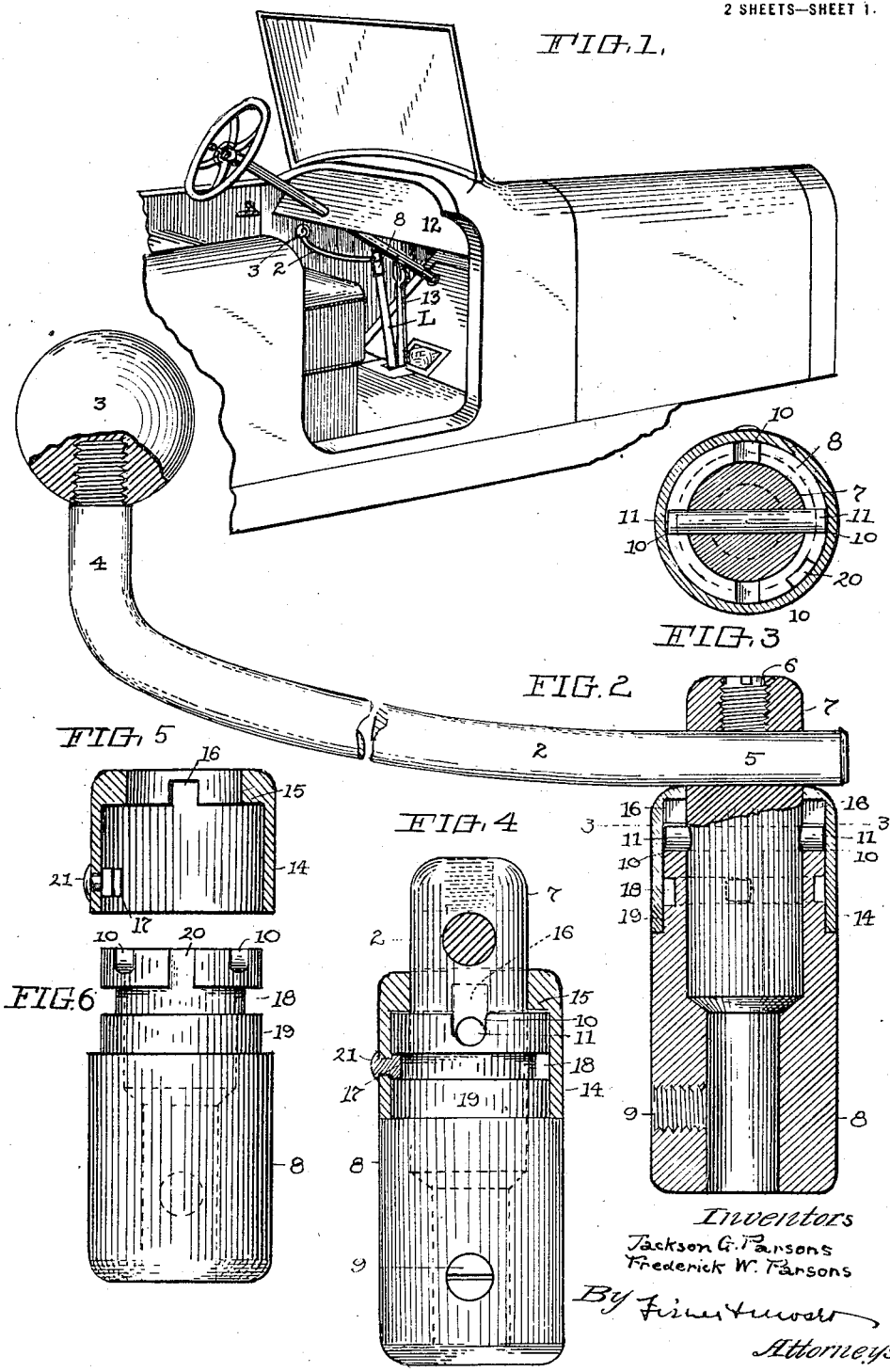

UNITED STATES PATENT OFFICE.

JACKSON G. PARSONS AND FREDERICK W. PARSONS, OF EAST CLEVELAND, OHIO.

CONTROLLING-LEVER FOR AUTOMOBILES.

1,285,351.  Specification of Letters Patent.  Patented Nov. 19, 1918.

Application filed March 6, 1917. Serial No. 152,452.

*To all whom it may concern:*

Be it known that I, JACKSON G. PARSONS and FREDERICK W. PARSONS, citizens of the United States, residing at East Cleveland, in the county of Cuyahoga and State of Ohio, have invented certain new and useful Improvements in Controlling-Levers for Automobiles, of which the following is a specification.

This invention relates to controlling levers for automobiles, and one object of the invention is to provide a horizontal extension or handle for a lever such as the gear-shifting lever of an automobile, whereby the lever may be conveniently actuated and shifted without requiring the operator to stretch or stoop, and a further object is to provide a rotatable connection for the handle to permit it to be turned out of the way and afford a free passage in front of the seat, and also to provide a simple lock to fix the handle in different set positions so that uninitiated persons may find difficulty in turning and resetting the handle.

In the accompanying drawing, Figure 1 is a perspective view of a portion of an automobile showing a gear-shifting lever equipped with the extension-handle hereinafter described. Fig. 2 is an enlarged side view, partly in section, of the extension-handle and its locking head. Fig. 3 is a cross section, in plan, on line 3—3, Fig. 2. Fig. 4 is a front view at right angles to Fig. 2, showing the locking cap and the handle arm or rod in cross section, and Fig. 5 is a sectional view of the locking cap removed. Fig. 6 is a side view of the socket head. Figs. 7 and 8 are plan and side views, respectively, of a modified form of the invention.

The gear-shifting lever L in an automobile is located invariably at the front of the driver's seat and at one side of the steering wheel, and in many instances centrally of the car and more or less beneath a cowl or an inwardly projecting dash. A common arrangement is to place this lever forwardly of the seat as far as possible to afford an unobstructed aisle or passage in front of the seat, which compels the driver to stretch and stoop to a considerable degree each time the lever is manipulated, and it is also well known that in shifting the gears this lever is movable in a lateral direction as well as in a forward and backward direction relatively to the seat. This invention is designed to facilitate the operation of the lever from the car seat without stretch or stoop by providing an extension-handle for the lever, consisting of a curved arm or rod 2 having a spherical grip 3 at its upturned end 4 and a straight portion 5 at its opposite end. Rod 2 is adjustably secured by a set screw 6 within a transverse opening extending through the outer end of a round cylindrical stem or stud 7 which is rotatably seated within a socket or seat in locking head 8 sleeved over the upper reduced extremity of lever L, and a set screw 9 locks head 8 rigidly in place. Many of the controlling levers in use have a screw-threaded extremity with a removable ball grip corresponding to grip 3, and head 8 is in the form of a cylindrical sleeve with a reduced bore adapted to slip over said threaded extremity, and is therefore easily substituted for the old ball or hand grip. However, the extension-handle must be locked against rotation in the head in order that lever L may be moved from side to side as well as forward and back in gear-shifting operations. Therefore, head 8 is provided with four radial notches or grooves 10 in its upper circular face or edge, and stud 7 is provided with a pin or set of radial lugs 11 adapted to occupy two of said grooves 10. Two sets of grooves are used to permit the extension-handle to be shifted relatively to the seat, and in one of its positions, the handle extends toward the seat with grip 3 relatively close to the front edge thereof where the driver can easily reach it and press the lever forward or to one side without stretching or stooping. In its other position as fixed by the lugs 11 and grooves 10 the handle rod 2 extends parallel with the front edge of the seat and close to the dash or cowl board 12.

A second controlling lever 13 is often placed at one side of lever L, and the operation of lever 13 may be obstructed by swinging the rod 2 parallel with the dash and across the path of movement of said lever 13, which is of advantage in preventing unauthorized use of the car by those uninitiated in the setting of the extension-handle. Moreover, a lock corresponding to a permutation lock is employed to safeguard the turning movements of the stud and handle in head 8. This lock consists of a cap or collar 14 having an internal annular shoulder 15 at its upper end which is provided with a pair of pockets or recesses 16 radially in its bottom face. When these pockets are placed in register with either set of grooves 10 by a turning movement of the cap, the pin or lugs 11 may enter said pockets or recesses 16 and the handle and stud raised the requisite distance to free the lugs 11 from grooves 10 in the head, thereby permitting the handle to be turned. In this turning movement the cap also turns and the lugs ride over the circular edge of head 8 until they reach and drop into the other set of grooves a quarter distance from the starting position. Then by rotating the cap in either direction a greater or less degree, the pockets and lugs 11 are placed out of register and it becomes impossible to raise the stud and turn the handle. Locking may be effected when the handle extends either toward the seat or the side of the car, and unlocking and shifting of the handle can only be effected when the cap pockets are placed directly opposite the lugs 11. However, it is also necessary to prevent uplift of the cap to effect complete locking results, and for this purpose a square-headed or flat-sided rivet 17 is used to hold the cap in place upon head 8. That is, the square head of said rivet is located upon the inside of the cap and projected into an annular channel 18 in the reduced end 19 of the head, and while the cap may be freely rotated it cannot be removed, except in one position of the parts where the rivet stands directly in line with a vertical slot 20 extending from channel 18 to the top edge of the head, see Fig. 6. In this case, the entire handle may be removed from lever L, that is, the cap may be lifted free from the head and the stud also.

The rounded head 21 of the rivet is exposed at the side of the cap, and by observing its relative location to some radial place on the head the constant user of the car becomes conversant with the proper placement of the cap for locking and unlocking purposes, but to the uninitiated there is no guide to register the pockets 16 with the lugs 11, or the rivet head with the slot 20, as all said parts are located internally of the device and absolutely concealed to the eye. Moreover, by locating the rivet in different radial positions relatively to the pockets in different caps, a different setting is required for each cap while outwardly all look substantially alike. Thus, the user of the device on one car is not necessarily familiar with the setting of a similar device on another car and cannot effect unlocking of the parts without considerable experimental manipulation of the permutation locking cap or collar 14.

In Figs. 7 and 8, a modified form of the invention is shown which permits the handle to be thown upwardly out of the way instead of swinging to one side as in the other form of the device. The same union of locking parts are used, but the head 8' is provided with a transverse opening 22 instead of an axial opening to receive the reduced extremity of lever L. Consequently, the head lies in a horizontal plane instead of standing upright, and the stud rotates on a horizontal axis which permits the handle to swing upwardly and out of the way of the person leaving or entering the vehicle. A thimble 23 is also used to extend the socket or opening 22 beyond the side of the head and to close and finish the outer end of the opening.

What we claim is:

1. In an automobile, a gear-shifting lever and an extension-handle mounted for independent movement thereon; and a separable locking connection for said parts, affording joint movement thereof laterally and an independent turning movement of the extension handle.

2. In an automobile, a gear-shifting lever and an extension-handle having a rotatable connection therewith, and means to lock said extension-handle immovably in position upon said lever.

3. A controlling lever for an automobile, an extension-handle mounted for independent movement upon said lever, and a permutation lock for said extension-handle adapted to secure the parts together for common movement.

4. A controlling lever for an automobile, an extension handle rotatably mounted upon said lever, and a rotatable permutation locking device to secure said extension-handle in immovable position upon said lever.

5. A controlling lever for an automobile, a socket head for said lever, and an extension-handle having a stud rotatably mounted in separable interlocking connection with said head.

6. A controlling lever for an automobile, interlocking members secured to the upper end of said lever, and a handle secured in adjustable extension connection with one of said interlocking members.

7. A controlling lever for an automobile, interlocking members affixed in rotatable union at the upper end of said lever, and an extension-handle for one of said members.

8. A controlling lever for an automobile, separable interlocking members mounted in rotatable connection upon said lever, and a rotatable permutation locking collar for said members.

9. A controlling lever and an extension-handle mounted to turn in respect thereto and having interlocking connections and a locking collar adapting the extension-handle to be immovably held in different set positions upon said lever.

10. An extension-handle for an automobile control lever, comprising a handle having a supporting stud provided with lateral lugs, a socket member to receive said stud having grooves to seat said lugs, and a collar rotatably secured upon said member having recesses to also seat said studs in turning movements of said handle.

11. An attachment for an automobile control lever, comprising a cylindrical socket member adapted to be fixed to the extremity of the lever and provided with radial notches, a stud rotatably mounted and movable axially within said socket member having radial lugs adapted to seat within said notches, a handle extending at one side of said stud, and a locking collar rotatably secured to said socket member having radial recesses to receive said lugs and permit axial movement of the stud.

12. An attachment for an automobile control lever, comprising a socket member and a stud rotatably mounted and movable axially therein, a handle extending from said stud, a rotatable collar to lock said stud against independent rotative and axial movements, and means for securing said collar in separable union with said socket member.

13. An attachment for an automobile control lever, comprising a socket head having an annular channel and a slot open to said channel and radial notches in its end, a stud confined within said socket member having radial lugs to seat within said notches, a handle extending laterally from said stud, and a collar having internal recesses adapted to register with said notches and lugs and provided with a fastening element projecting into said channel.

14. An attachment for an automobile control lever, comprising a cylindrical socket member having end notches and an annular channel and side slot, a stud seated within said socket member having radial lugs adapted to enter said notches, a handle extending from said stud, a locking collar having internal recesses adapted to register with said notches and lugs and provided with a flat-sided projection extending into said channel and adapted to pass through said slot.

15. An attachment for an automobile control lever, comprising a stud member and a handle in adjustable extensible connection therewith, a socket member seating said stud having radial notches at its end and an annular channel in its side, a projecting pin extending through said stud adapted to seat within said notches, and a locking collar having internal recesses adapted to register with said notches and pin when rotated for this purpose and provided with a locking projection extending into said channel.

Signed at Cleveland, in the county of Cuyahoga, and State of Ohio, this 28th day of February, 1917.

JACKSON G. PARSONS.
FREDERICK W. PARSONS.